(12) United States Patent
Yamaguchi

(10) Patent No.: US 6,713,911 B2
(45) Date of Patent: Mar. 30, 2004

(54) DISC-SHAPED ECCENTRIC ROTOR AND FLAT TYPE VIBRATOR MOTOR HAVING THE ROTOR

(75) Inventor: Tadao Yamaguchi, Isesaki (JP)

(73) Assignee: Tokyo Parts Industrial Co., Ltd., Isesaki (JP)

( * ) Notice: Subject to any disclaimer, the term of this patent is extended or adjusted under 35 U.S.C. 154(b) by 0 days.

(21) Appl. No.: 09/924,770

(22) Filed: Aug. 9, 2001

(65) Prior Publication Data

US 2002/0047371 A1 Apr. 25, 2002

(30) Foreign Application Priority Data

Aug. 11, 2000 (JP) ........................................ 2000-244571
Mar. 21, 2001 (JP) ........................................ 2001-080420

(51) Int. Cl.$^7$ ............................. H02K 7/06; H02K 7/10
(52) U.S. Cl. ........................... 310/81; 310/71; 310/233; 310/237
(58) Field of Search .................. 310/81, 71, DIG. 6, 310/40 MN, 233, 234, 235, 237

(56) References Cited

U.S. PATENT DOCUMENTS

| | | | | |
|---|---|---|---|---|
| 4,661,733 A | * | 4/1987 | Heyraud | 310/68 R |
| 5,036,239 A | * | 7/1991 | Yamaguchi | 310/268 |
| 5,107,155 A | * | 4/1992 | Yamaguchi | 310/81 |
| 5,341,057 A | * | 8/1994 | Yamaguchi et al. | 310/81 |
| 5,793,133 A | * | 8/1998 | Shiraki et al. | 310/81 |
| 5,942,833 A | * | 8/1999 | Yamaguchi | 310/268 |
| 6,011,333 A | * | 1/2000 | Yamaguchi et al. | 310/81 |
| 6,291,915 B1 | * | 9/2001 | Yamaguchi | 310/71 |

* cited by examiner

Primary Examiner—Thanh Lam
(74) Attorney, Agent, or Firm—Leydig, Voit & Mayer, Ltd.

(57) ABSTRACT

The present invention provides a disc-shaped eccentric rotor having at least two air-core coils. The rotor includes a flat commutator member having a central shaft insertion through hole, commutator land segments arranged around the shaft insertion through hole on a first side of the flat commutator member, wound air-core coil arrangement guides located around the shaft insertion through hole on a second side of the flat commutator member, air-core coil end portion connection lands arranged circumferentially on the second side of the flat commutator member, a shaft holder installed around the shaft insertion through hole on the second side of the flat commutator member, and wound air-core coils installed at the wound air-core coil arrangement guides and having end portions connected to the air-core coil end portion connection lands. The air-core coils of bigger sizes are uniformly arranged on the commutator member, so that high efficiency and easy Installation can be achieved. The arrangement of the air-core coils offsets the center of gravity from the geometrical centroid of the rotor, and there is no need for an additional eccentric member. Since the printed wiring air-core coil is thinner than the wound air-core coil, an eccentric weight is installed on the printed wiring air-core coil so that a great amount of vibration may be obtained during rotation of the rotor.

9 Claims, 8 Drawing Sheets

DISC-SHAPED ECCENTRIC ROTOR AND FLAT TYPE VIBRATOR MOTOR HAVING THE ROTOR

BACKGROUND OF THE INVENTION

1. Field of the Invention

The present invention relates to an improved flat type vibrator motor used as a silent call means of a mobile communications apparatus and an improved eccentric rotor which is one of the major members thereof.

2. Description of the Related Art

A conventional cylindrical DC motor, which is used as a silent call means of a pager or mobile phone, is shown in FIG. 8. As shown in the drawing, an eccentric weight W formed of tungsten alloy is installed at an output shaft S of a cylindrical DC motor M. When the motor M rotates, vibrations are generated by the centrifugal force of the eccentric weight W.

However, this conventional method of adding the eccentric weight W to the output shaft S has disadvantages. That is, when an apparatus such as a pager is designed, a space for rotation of the eccentric weight W should be considered. Also, since an expensive tungsten alloy is used, the manufacturing cost increases.

Recently, there is a need for a small cylindrical DC motor and a motor having a diameter of 4 mm is being used. However, although a main body of a motor has a diameter of 4 mm, the diameter of a space for rotation of the eccentric weight provided at the output shaft should be at least 6 mm to obtain a sufficient amount of vibration. Also, since the cylindrical motor cannot be mounted in a mobile phone as it is, an additional installation member is usually needed. Thus, the cylindrical motor requires a large space, which makes it difficult to manufacture a mobile apparatus which is thin.

Furthermore, while a great deal of current is consumed, its efficiency is a mere 20–30%. Accordingly, a flat type motor which can secure a thickness less than 3 mm is being widely noted.

The subject applicant has suggested a flat type coreless vibrator motor in Japanese Patent No. 2,137,724 and U.S. Pat. No. 5,036,239. In the flat type coreless vibrator motor, an output shaft protruding outside the motor is removed and one of three air-core coils symmetrically arranged on a rotary commutator member is installed at the opposite side of the commutator member, so that the three air-core coils are grouped together and eccentricity is achieved by inclining the rotor itself.

Since an effective conductive body of an armature coil of the above motor is long, a relatively high efficiency can be obtained. The motor is designed such that a current of about 10 mA flows at a voltage of 3 V. Also, since the output shaft and the eccentric weight do not protrude outside the motor, there is no great limit in space. However, since three wound type air-core coils are provided at one surface of the commutator member, the size of the air-core coils needs to be reduced. Thus, the number of parts and steps increases.

In the above flat type motor having a built-in type eccentric rotor where three armature coils are grouped together, as the motor becomes smaller, the interval between the armature coils decreases so that connecting the end portions of the armature coils to the commutator with no damage to the armature coils is very difficult. Also, since each of the armature coils needs to fit within an angle between the adjacent magnetic poles of a magnet, improvement of efficiency is further required. Also, since there are three wound type air-core coils, the number of parts increases.

Recently, as mobile phones become smaller, a great amount of vibration as a silent call means is not needed any more.

SUMMARY OF THE INVENTION

To solve the above-described problems, it is a first object of the present invention to provide a disc eccentric rotor which appropriately generates vibrations by centrifugal force with high efficiency and can be easily installed, and a flat vibrator motor using the same.

It is a second object of the present invention to provide a disc eccentric rotor which does not need an eccentric member by arranging the center of gravity of the rotor to be eccentric by using the coils themselves.

It is a third object of the present invention to provide a flat vibrator motor which uses the above flat, disc eccentric rotor so that high efficiency is achieved, the number of parts is reduced, and manufacturing cost is lowered.

It is a fourth object of the present invention to produce vibrations by using a difference in centrifugal forces, which is achieved by arranging a metal member having a high specific gravity at a portion where no wound air-core coils exist.

To achieve the foregoing objects, a first disc eccentric rotor having two or more air-core coils and generating a difference in centrifugal forces by the rotation of the rotor itself, is provided, the rotor comprising a flat commutator member having a shaft insertion through hole in the center thereof, a plurality of commutator land segments formed around the shaft insertion through hole on a first side of the flat commutator member, wound air-core coil arrangement guides outside the shaft insertion through hole on a second side of the flat commutator member, air-core coil end portion connection lands circumferentially on the second side of the flat commutator member, a shaft holder installed around the shaft insertion through hole on the second side of the flat commutator member, and wound air-core coils installed at the wound air-core coil arrangement guides and having the end portions connected to the air-core coil end portion connection lands.

In the rotor, the air-core coils are radially arranged at a predetermined angle and at least one air-core coil is a printed wiring air-core coil.

Further, the air-core coils comprise one printed wiring air-core coil and two wound air-core coils, and the air-core coils are arranged so as not to overlap one another. Otherwise, the air-core coils comprise two printed wiring air-core coils and one wound air-core coil, and the air-core coils are arranged so as not to overlap one another.

It is preferable that the wound air-core coil arrangement guide apertures and reinforcement holes are on the printed wiring commutator member, and the reinforcement holes and the wound air-core coil arrangement guide apertures are respectively connected through grooves.

Moreover, it is preferable that the shaft holder and the wound air-core coil arrangement guides are integrally formed of the same resin by outsert molding on the flat commutator member.

As another way to achieve the foregoing objects, a second disc eccentric rotor having one or more wound air-core coils and generating a difference in centrifugal forces by the rotation of the rotor itself, is provided, the rotor comprising a flat commutator member having a shaft insertion through hole in the center thereof, a plurality of commutator land segments formed around the shaft insertion through hole on a first side of the flat commutator member, a shaft holder installed around the shaft insertion through hole on a second side of the flat commutator member, wound air-core coil end portion connection lands formed circumferentially on the second side of the flat commutator member, at least one wound air-core coil installed outside the shaft holder on the second side of the flat commutator member and having the end portions thereof connected to the wound air-core coil end portion connection lands, and an eccentric weight formed of tungsten alloy installed within the thickness of the wound air-core coil on the second side of the flat commutator member, the weight being fixed to the flat commutator member by resin.

Further, in the second disk eccentric rotor, at least one printed wiring coil is at a position of the flat commutator member where the eccentric weight is installed.

As yet another way to achieve the foregoing objects, there is provided a flat vibrator motor having the eccentric rotor as described above. Here, the flat vibrator motor comprises a disc eccentric rotor having at least one air-core coil and generating a difference in centrifugal forces by the rotation of the rotor itself, a shaft for supporting the eccentric rotor, a magnet for providing a magnetic field for the rotor via a gap therebetween in an axial direction, a brush arranged inside the magnet for providing electric power to the air-core coil through the flat commutator member, and a housing accommodating all the elements described above.

In the flat vibrator motor, the shaft is fixed at one side of the housing and a member for preventing the eccentric rotor from moving in a radial direction is installed at the other side of the housing.

Since the rotor is of a disc, the size of each air-core coil can be set such that the effective conductive portions can be positioned within an open angle of two adjacent magnetic poles. Therefore, the maximum vibrations are generated so as to secure high efficiency. The open angle of two adjacent magnetic poles are called "standard electric open angle." The connection of the coil end portions can be easily performed. Also, the disc rotor can be eccentric.

The rotor is not arranged to be inclined toward the side. The size of each air-core coil can be set such that the effective conductive portions can be positioned within the standard electric open angle. Also, since the eccentricity due to the difference in weight between the printed wiring air-core coil and the wound air-core coil can be anticipated, a disc rotor which can easily generate vibrations due to the difference in the centrifugal forces during rotation is possible.

Since the eccentricity due to the difference in weight between the printed wiring air-core coil and the wound air-core coil can be anticipated, a disc rotor which can easily generate vibrations due to a difference in the centrifugal forces during rotation is possible. Also, since one or two wound air-core coils suffice, the manufacturing cost can be reduced.

When the shaft holder and the wound air-core coil arrangement guides are erected by outsert molding on the wound air-core coil arrangement guide apertures and the reinforcement holes, resin fills the insertion pass portion so that the wound air-core coil arrangement guides, the stop walls, and the shaft holder are integrally connected, which improves strength.

The shaft holder and the wound air-core coil arrangement guides can be formed simultaneously.

A disc rotor according to the invention can generate large vibrations due to high specific gravity of tungsten alloy. Since fewer air-core coils are required, the manufacturing cost is reduced.

Since the vibrator motor has the above-described rotor, the manufacturing cost is reduced while large vibrations can be obtained.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
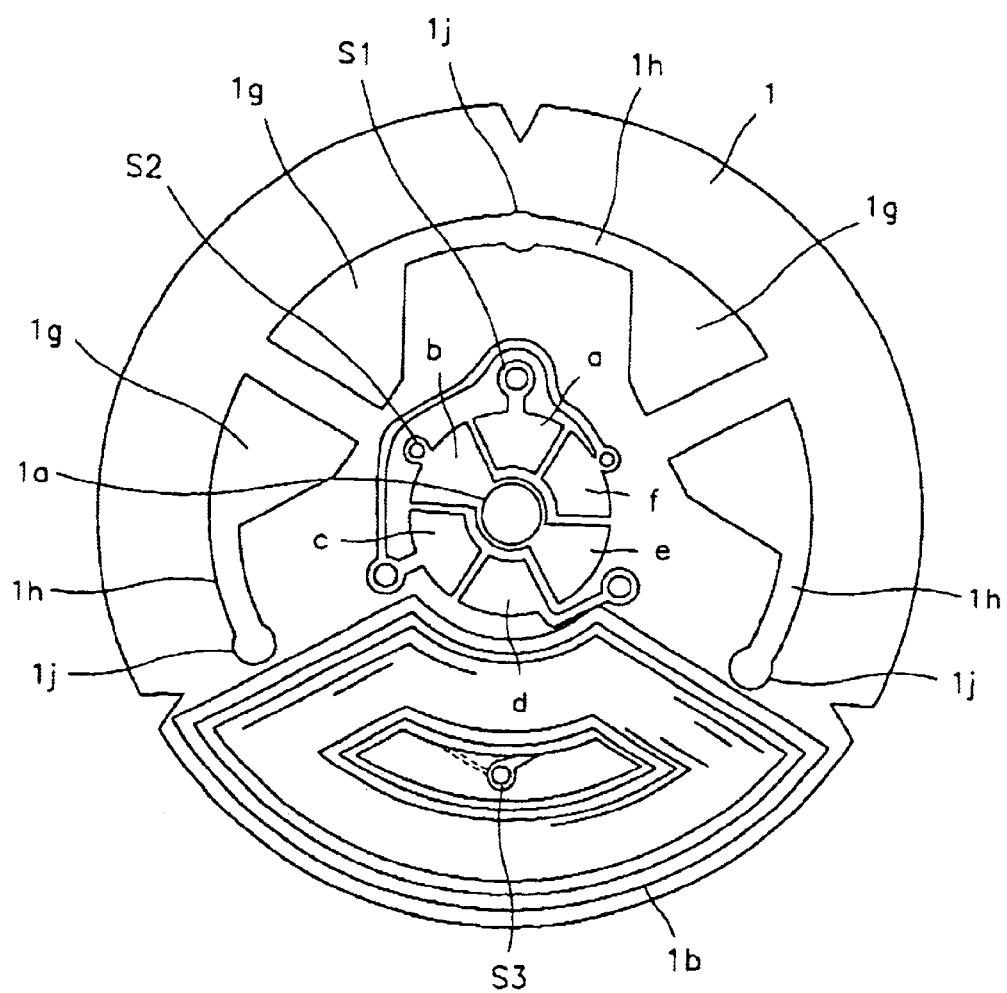
FIG. 1 is a view showing one side of a flat type commutator member of a disc type eccentric rotor according to a first preferred embodiment of the present invention.

Referring to FIG. 1, reference numeral 1 denotes a flat, disc type commutator member as a printed wiring board, at both sides of which a thin copper plate having a thickness of 0.3 mm is formed. A shaft insertion hole 1a is formed at the center of the flat type commutator member 1. Segments around the shaft insertion hole 1a which face one another are short-circuited by through holes S1 and S2 by using the opposite side of the commutator member so that six commutator land segments a, b, c, d, e, and f are formed. A printed wiring type air-core coil 1b is formed outside the commutator land segments such that effective conductive portions of the printed wiring type air-core coil, i.e., the portions of the coil which are oriented in the radial direction and provide the maximum attractive and repulsive forces, are widened to an angle of about 90° (the same as an angle between two adjacent magnetic poles with respect to the center of the rotor).

Figure 2:
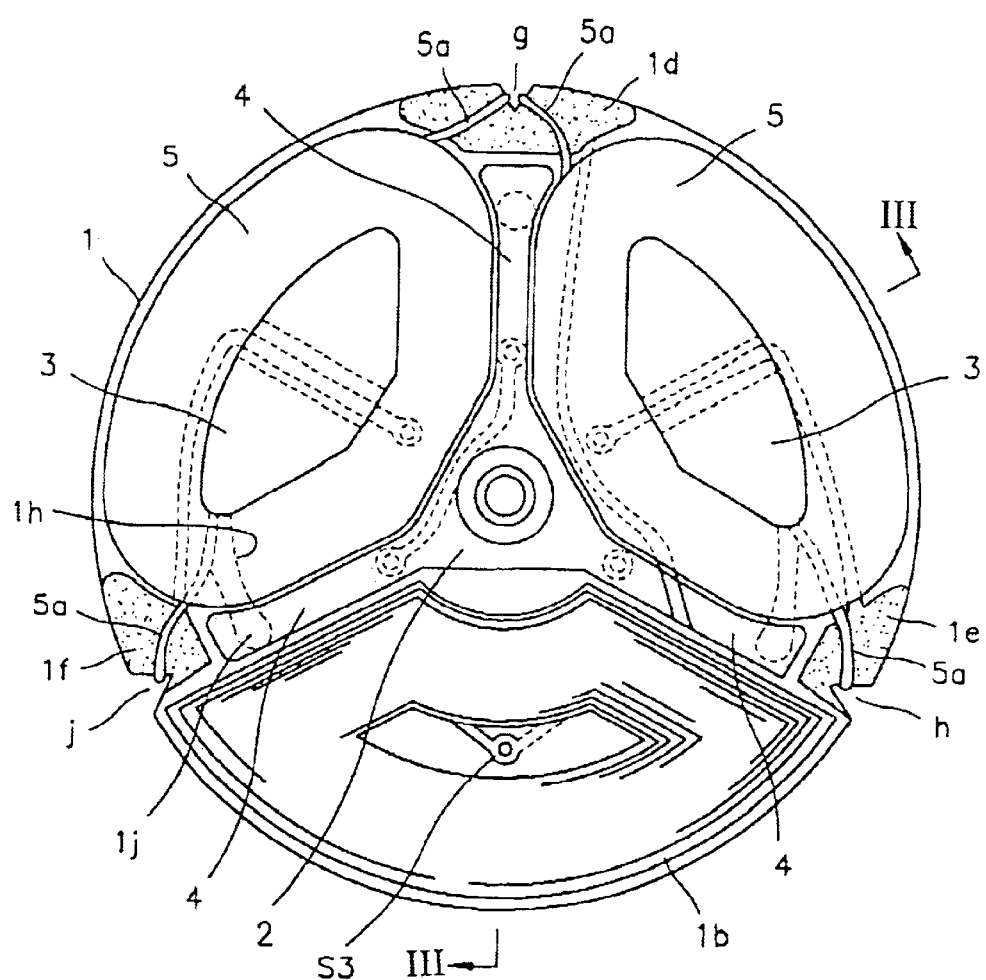
FIG. 2 is a view showing the other side of the flat type commutator member of FIG. 1.

As shown in FIG. 2, an end portion connection land 1d and start portion connection lands 1e and 1f of the air-core coils 1b are formed at the outer circumferential portion of the opposite surface of the commutator member 1. Here, the start portion of the printed wiring type air-core coil 1b is directly connected to the commutator land segment d of FIG. 1. Partition walls, in which land leads are installed, are formed at positions respectively 120° apart from the centroid of the printed wiring type air-core coil 1b. Wound type air-core coil arrangement guide apertures 1g are arranged at both sides of each of the partition walls. Three reinforced holes 1j formed by punching at positions which are found symmetrically on a circular arc excluding the printed wiring type air-core coil 1b, are connected to the wound type air-core coil arrangement guide apertures 1g by an insertion pass portion 1h for reinforcement thereof. The through hole S1 is formed to have a slightly greater diameter so as to function as a reinforcement hole.

Also, the printed wiring type air-core coil 1b is connected in serial to one identically formed at the other side thereof through a through hole S3 to increase the number of windings. Also, in FIGS. 1 and 2, the printed wiring type air-core coil 1b is represented by solid lines for the convenience of explanation. Since the corners of a printed wiring type air-core coil can be formed to have more acute angles than those of a wound type air-core coil, a great torque can be obtained by fully straightening the effective conductive lengths, so that the angle between the lengths makes the same angle as that between the two adjacent magnetic poles.

Notches g, h, and j are formed at each connection land installed at the outer circumferential portion of the flat commutator member. When the portion of a coil is soldered or heat welded, the coil end portion is held by being hooked at the notches so that the coil can be temporarily fixed.

Also, the surfaces of the six commutator land segments are gold-plated so that the land segments themselves can form commutator pieces. Therefore, a flat type commutator can be achieved. Otherwise, if the land segments are realized with thin copper plates, a separate commutator may be connected to the land segments.

Figure 3:
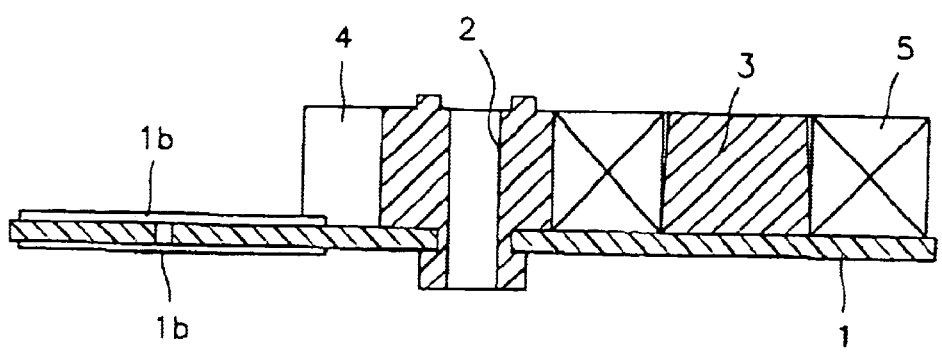
FIG. 3 is a sectional view of the flat type commutator member, taken along line A—A of FIG. 2.
Figure 7:
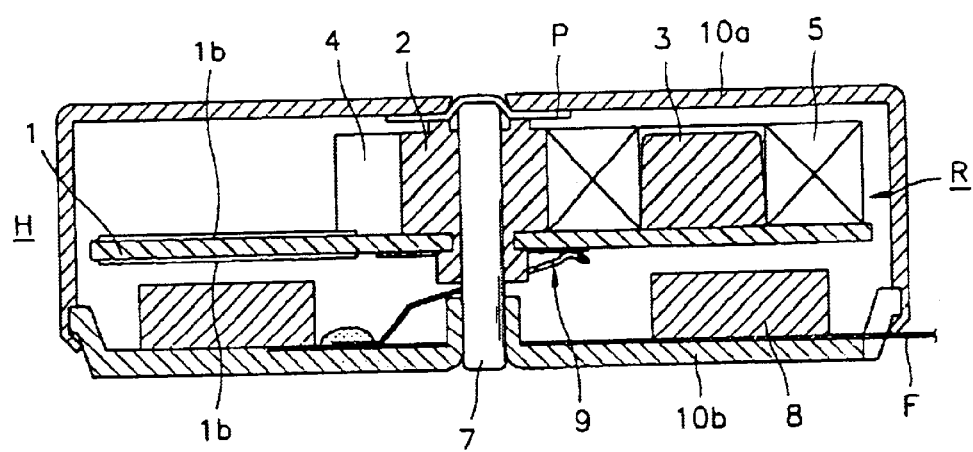
FIG. 7 is a sectional view of a flat type coreless vibrator motor using the disc type eccentric rotor of FIGS. 2 and 3.
Figure 8:
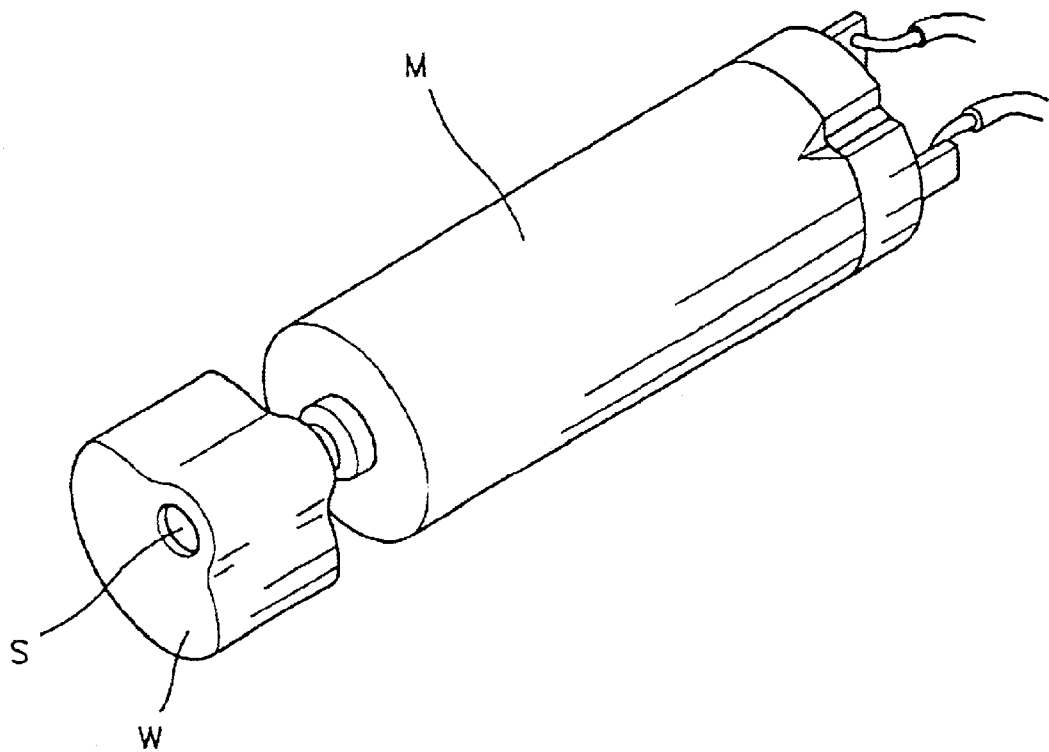
FIG. 8 is a perspective view of a conventional small vibrator motor.

In order to form a disc type eccentric rotor R of FIG. 7 by using the above flat type commutator member 1, as shown in FIGS. 2 and 3, a shaft holder 2, two wound type air-core coil arrangement guides 3 and three stop walls 4 are formed of highly slippery resin having a specific gravity of about 4 at the other surface of the commutator member. Here, the wound type air-core coil arrangement guides 3 function as inner supports inside the coils, and the stop walls 4 also function as outer supports outside the coils. Since the reinforcement hole 1j and the wound type air-core coil arrangement guide apertures 1g are connected to each other via the insertion pass portion 1h, the wound type air-core coil arrangement guides 3 and the stop walls 4 are formed on the reinforcement holes 1j and the wound type air-core coil arrangement guide apertures 1g by means of outsert integral molding while the molding resin fills the insertion pass portion 1h. The wound type air-core coils 5 formed such that the effective conductive portions thereof are widened to an angle of about 90°, are installed at the two wound type air-core coil arrangement guides 3.

The end portions 5a of the wound type air-core coils 5 are connected to the end portion connection lands 1d, 1e, and 1f by means of soldering or heat welding.

Figure 4:
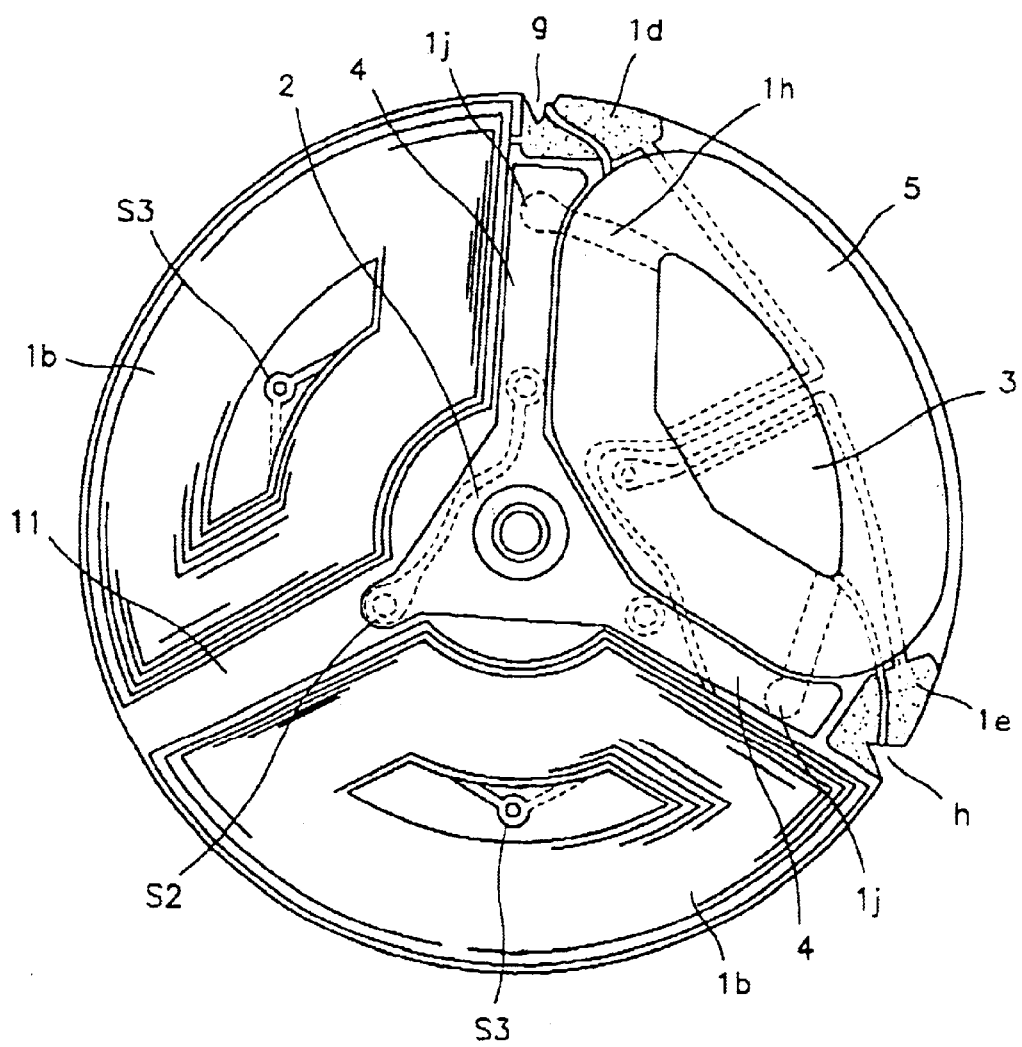
FIG. 4 is a plan view of a flat type commutator member of a disc type eccentric rotor according to a second preferred embodiment of the present invention.

FIG. 4 shows a disc type flat commutator member 11 of a disc type eccentric rotor according to a second preferred embodiment of the present invention. The disc type flat commutator member 11 is formed such that two printed wiring type air-core coils 1b and a wound type air-core coil 5 can be arranged thereon. In this case, two stop walls 4 suffice because they are needed only to determine the position of the wound type air-core coil 5. Also, two end portion connection lands arranged at the outer circumferential portion of the commutator member suffice. Thus, since only one wound type air-core coil is needed, the manufacturing cost is lowered. In the drawings, the same members have the same reference numerals and descriptions thereof will be omitted.

Figure 5:
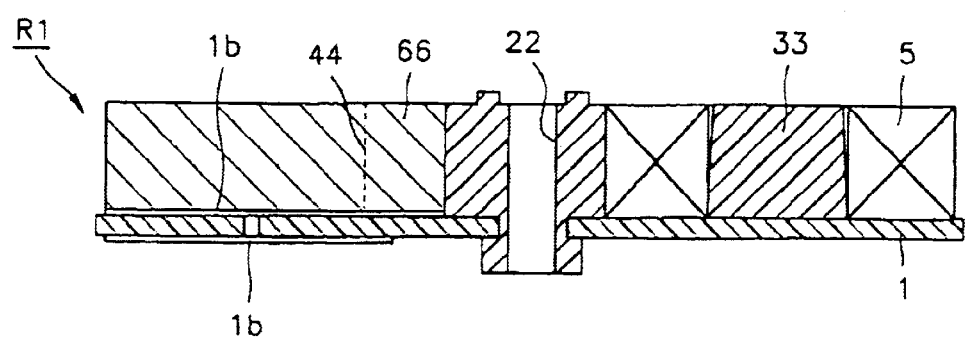
FIG. 5 is a sectional view showing major portions of a flat type commutator member of a disc type eccentric rotor according to a third preferred embodiment of the present invention.

FIG. 5 shows a disc type eccentric rotor having a flat type commutator member according to a third preferred embodiment of the present invention. That is, considering the difference in thickness between the printed wiring type air-core coil 1b and the wound type air-core coil 5, to obtain a great amount of vibration, an eccentric weight 66 having a high specific gravity and formed of tungsten alloy is installed at the position of a printed wiring type air-core coil 1b, while the thickness of the eccentric weight 66 is not greater than that of the wound type air-core coil 5, thus forming an eccentric rotor R1. Thus, even if the eccentric weight 66 is installed, the thickness of the eccentric rotor R1 is not affected.

In this case, the position of the center of gravity is determined contrary to those of the above preferred embodiments. A shaft holder 22, two wound type air-core coil arrangement guides 33, and three stop walls 44 are preferably formed of highly slippery resin which is light (for example, polyamide based resin including potassium titanate whisker having a specific gravity of about 1.3). In other portions of the structure of the above rotor, the same members have the same reference numerals and descriptions thereof will be omitted.

Figure 6:
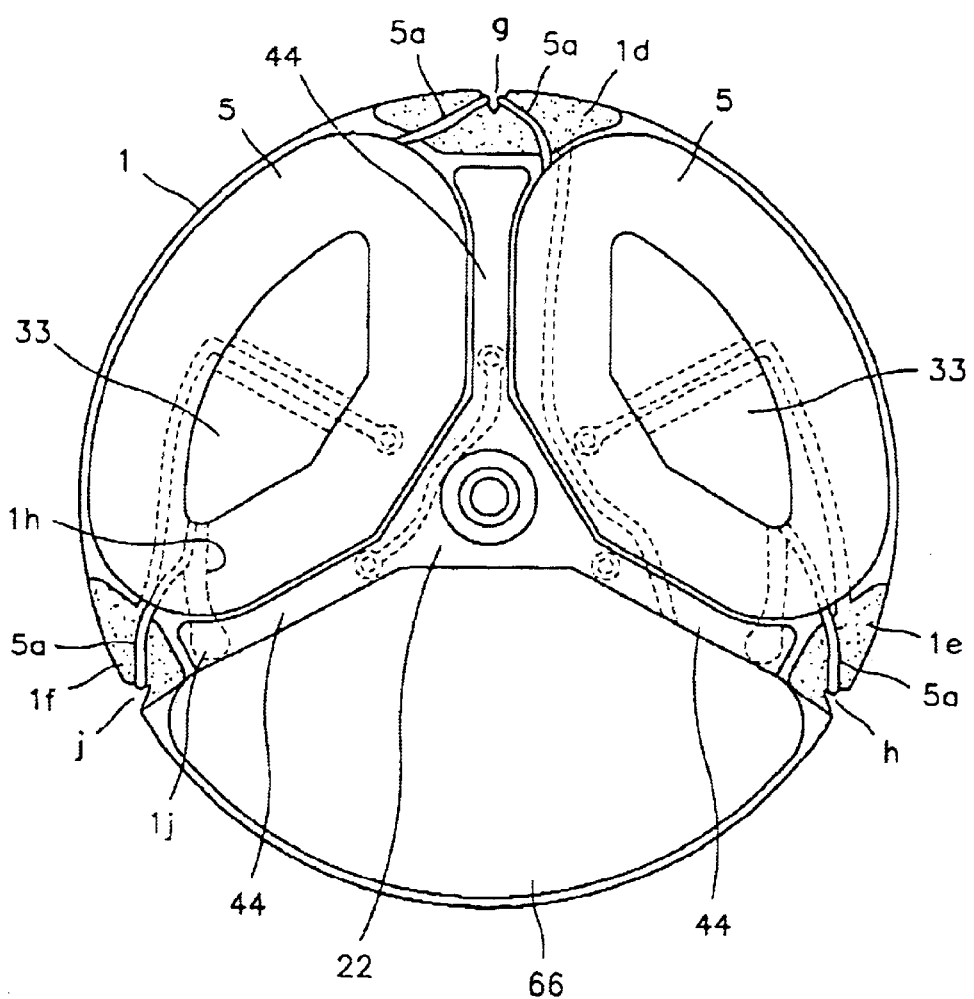
FIG. 6 is a plan view showing a modification example of the rotor of FIG. 5.

FIG. 6 shows a modification example of the rotor of the third preferred embodiment. The two wound type air-core coils 5 are arranged at an angle of 110–135° (120° in FIG. 6). The eccentric weight 66 formed of tungsten alloy is placed at the opposite side with respect to a shaft within a thickness of the wound type air-core coil 5. The eccentric weight 66 may be integrally fixed to the flat type commutator member 1 by means of resin. In this case, the printed wiring type air-core coil is not formed on the side of the commutator member on which the eccentric weight 66 is placed.

Since the specific weight of the tungsten alloy is 18 or more while that of a copper wire of the wound type air-core coil 5 is 8, the center of gravity moves toward the eccentric weight 66 so that great eccentricity can be obtained.

FIG. 7 shows a shaft-fixed flat type vibrator motor having the eccentric rotor shown in FIGS. 2 and 3. That is, the motor includes an eccentric rotor R, a shaft 7 for supporting the eccentric rotor R to be capable of rotating, a magnet 8 for applying a magnetic field to the eccentric rotor R via a gap therebetween, a brush 9 arranged inside the magnet 8 for applying electric power to each of the printed wiring type and wound type air-core coils 1b and 5 via the flat type commutator member 1, and a housing 10 including a case 10a for accommodating all the above-mentioned members and a bracket 10b for fixing the shaft 7.

In FIG. 7, reference letter P denotes a sliding member formed of a polyester film. When the eccentric rotor R is elastically pressed toward the case 10a by a pressing force of the brush 9, the sliding member P slides smoothly. Also, the sliding member P prevents the shaft 7 from protruding outside the case 10a. The sliding member P restricts the movement of the shaft 7 in a radial direction so as to be resistant to impacts such as dropping. In FIG. 7, reference letter F denotes a flexible electricity feeding lead wire to which the brush 9 is soldered.

In each of the above-preferred embodiments, the printed wiring type air-core coils are formed at both sides of the flat type commutator member 1 in two layers. However, the number of windings can be increased by forming a 4–6 layered printed wiring type air-core coil by arranging a multilayer substrate having two or three laminated printed wiring boards each having a thickness of about 0.1 mm at both sides of the flat type commutator member 1.

Also, in each of the above-preferred embodiments, the wound type air-core coil is placed on a printed wiring board. However, part of the wound type air-core coil may be buried by forming the wound type air-core coil arrangement guide aperture to be slightly greater than the wound type air-core coil in the printed wiring board. Otherwise, the wound type air-core coil may be entirely covered with the slippery resin. Thus, the gap between the magnet and the wound type air-core coil can be reduced by the thickness of the printed wiring board, so that the air-gap magnetic flux density can increase substantially.

Also, although the shaft holder formed of resin functions as a bearing, a metal sintered oily bearing may be used as the shaft holder. Further, it is possible that the shaft is fixed to the eccentric rotor and a bearing is arranged at the housing.

As described above, in the disc eccentric rotor having the above structure according to the present invention, vibrations due to a centrifugal force are appropriately generated and the air-core coils are large and uniformly arranged, so that high efficiency can be obtained. Also, since one or two wound air-core coils suffice, installation and line connection can be easily performed.

Since the flat commutator member is a disc, the size of each air-core coil can be set such that the effective conductive portions can be positioned within an open angle of two adjacent magnetic poles. The connection of the coil end portion can be easily performed. Also, the disc rotor can be eccentric.

The rotor is not arranged to be inclined toward the side. The size of each air-core coil can be set such that the effective conductive portions can be positioned within the standard electric open angle. Also, since the eccentricity due to the difference in weight between the printed wiring air-core coil and the wound air-core coil can be anticipated, a disc rotor which can easily generate vibrations by centrifugal force during rotation is possible.

Since the eccentricity due to the difference in weight between the printed wiring air-core coil and the wound air-core coil can be anticipated, a disc rotor which can easily generate vibrations by centrifugal force during rotation is possible. Also, since one or two wound air-core coils suffice, the manufacturing cost can be reduced.

When the shaft holder and the wound air-core coil arrangement guides are erected by outsert molding on the wound air-core coil arrangement guide apertures and the reinforcement holes, resin fills the insertion pass portion so that the wound air-core coil arrangement guides, the stop walls, and the shaft holder are integrally connected, which improves strength.

The shaft holder and the wound air-core coil arrangement guides can be formed simultaneously.

A disc rotor generating large vibrations can be obtained due to high specific gravity of tungsten alloy. Since fewer air-core coils are required, the manufacturing cost is reduced.

Since the vibrator motor has the above-described rotor, the manufacturing cost is reduced while large vibrations can be obtained.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A disc-shaped eccentric rotor comprising:
   at least one wound air-core coil and at least one printed wiring air-core coil generating a difference in centrifugal forces upon the rotation of the rotor;
   a fiat commutator member having a central shaft insertion through hole;
   a plurality of commutator land segments located around the shaft insertion through hole on a first side of the flat commutator member;
   wound air-core coil end portion connection lands arranged circumferentially on a second side of the flat commutator member;
   a shaft holder installed around the shaft insertion through hole on the second side of the flat commutator member; and
   a tungsten alloy eccentric weight no thicker than the wound air-core coil on the second side of the flat commutator member and adhered with a resin to the fiat commutator member, wherein the wound air-core coil is connected to the wound air-core coil end portion connection lands, the air-core coils are radially arranged at an angular interval, and the rotor has a circular shape.

2. The rotor as claimed in claim 1, wherein the air-core coils comprise one printed wiring air-core coil and two wound air-core coils, and the air-core coils do not overlap one another.

3. The rotor as claimed in claim 1, wherein the air-core coils comprise two printed wiring air-core coils and one wound air-core coil, and the air-core coils do not overlap one another.

4. The rotor as claimed in claim 1, including wound air-core coil arrangement guide apertures and reinforcement holes on the flat commutator member, wherein the reinforcement holes and the wound air-core coil arrangement guide apertures are respectively connected through grooves.

5. The rotor as claimed in claim 1, wherein the air-core coils comprise two printed wiring air-core coils and one wound air-core coil, the air-core coils do not overlap one another, and the shaft holder and the wound air-core coil arrangement guides are integral with the flat commutator member.

6. The rotor as claimed in claim 1, wherein at least one printed wiring coil is located at a position of the flat commutator member where the eccentric weight is located.

7. The rotor as claimed in claim 1, further comprising wound air-core coil arrangement guides outside the shaft insertion through hole on the second side of the flat commutator member.

8. A flat vibrator motor comprising:
   circular eccentric rotor having at least one air-core coil and generating a difference in centrifugal forces by the rotation of the rotor,
   a shaft supporting the eccentric rotor;
   a magnet providing a magnetic field for the rotor via an axial gap between the magnet and the rotor,
   a brush inside the magnet providing electric power to the air-core coil through the flat commutator member, and
   a housing accommodating the rotor, the shaft, the magnet, and the brush.

9. The vibrator motor as claimed in claim 8, wherein the shaft is fixed at a first side of the housing and including a member for preventing the eccentric rotor from moving in a radial direction installed at a second side of the housing.

* * * * *